United States Patent
Bright

(10) Patent No.: US 8,358,035 B2
(45) Date of Patent: Jan. 22, 2013

(54) ELECTRICAL GENERATOR ARRANGEMENTS

(75) Inventor: Christopher G Bright, Nottingham (GB)

(73) Assignee: Rolls-Royce, PLC, London (GB)

( * ) Notice: Subject to any disclaimer, the term of this patent is extended or adjusted under 35 U.S.C. 154(b) by 352 days.

(21) Appl. No.: 12/739,080

(22) PCT Filed: Sep. 23, 2008

(86) PCT No.: PCT/GB2008/003206
§ 371 (c)(1),
(2), (4) Date: May 4, 2010

(87) PCT Pub. No.: WO2009/053668
PCT Pub. Date: Apr. 30, 2009

(65) Prior Publication Data
US 2011/0031810 A1   Feb. 10, 2011

(30) Foreign Application Priority Data

Oct. 26, 2007 (GB) .................................. 0721167.5

(51) Int. Cl.
*H02J 1/00* (2006.01)
*H02J 3/00* (2006.01)

(52) U.S. Cl. ............... 307/84; 361/20; 361/62; 700/292

(58) Field of Classification Search .................... 307/51, 307/84, 85, 87; 361/20, 62, 64; 700/292, 700/294
See application file for complete search history.

(56) References Cited

U.S. PATENT DOCUMENTS
2005/0275979 A1* 12/2005 Xu .................................. 361/20

FOREIGN PATENT DOCUMENTS
EP   0 677 911 A1   10/1995
WO   WO 01/82444 A1   11/2001

OTHER PUBLICATIONS

Bright, C., "COROCOF: Comparison of Rate of Change of Frequency Protection. A Solution to the Detection of Loss of Mains," *Proceedings Seventh International Conference on Developments in Power System Protection (IEE)*, Apr. 9, 2001, pp. 70-73, XP-002538636.
International Search Report issued in International Application No. PCT/GB2008/003206 on Aug. 12, 2009.
Written Opinion of the International Searching Authority issued in International Application No. PCT/GB2008/003206 on Aug. 12, 2009.

* cited by examiner

*Primary Examiner* — Carlos Amaya
(74) *Attorney, Agent, or Firm* — Oliff & Berridge, PLC

(57) ABSTRACT

An electrical generator arrangement comprising a distribution network having a first generator and a second generator, the first generator arranged to provide electrical power to a transmitter source, the second generator coupled to the distribution network by a switch to enable isolation of the second generator, the switch associated with an electrical characteristic comparator to compare the phase and/or frequency of the voltage provided by the second generator with the incidental modulation of a transmitter signal from the transmitter due to variations in the phase and/or frequency of the voltage provided by the first generator to the transmitter, the comparator arranged to operate the switch to isolate or connect the second generator to the distribution network dependent upon a variation in the change of the phase and/or frequency of the voltage provided by the second generator and the incidental modulation of the transmitted signal.

22 Claims, 5 Drawing Sheets

ELECTRICAL GENERATOR ARRANGEMENTS

The present invention relates to electrical generator arrangements and more particularly to distributed electrical generator arrangements in which a number of electrical generators are all connected within an appropriate electrical distribution network in order to provide electrical power throughout the electrical distribution network.

In order to make efficient and better use of a variety of sources of electrical generation it is increasingly desirable to utilise solar power and wind power in order to act as primary sources for electrical power generation. By their nature such sources of electrical power generation are small and more dispersed than previous large conventional power station generators. Small generators tend to be connected to a lower voltage electrical distribution system. Higher voltage electrical transmission systems receive electrical power from higher power conventional power stations. Lower and higher voltage systems are connected by transformers.

BRIEF DESCRIPTION OF THE DRAWINGS

FIG. 1 provides an illustration of a typical prior art distributed electrical generator arrangement. In such circumstances a generator 11 at a high voltage power station has a high voltage generator circuit-breaker 12 which connects the generator 11 to a high voltage electrical power distribution network or system 13. A lower voltage electrical power system 14 is connected to the higher voltage electrical power system 13 by one or more electrical transformers 15. Each electrical transformer 15 is possibly equipped with a high voltage circuit-breaker 16 and a low voltage circuit-breaker 17. A distributed generator 18 is connected to the lower voltage electrical power system by a generator circuit-breaker 19. The transformer 15 allows the low voltage generator 18 to be connected to the high voltage distribution system 13 and the high voltage generator 11 to be connected to the low voltage distribution system 14.

It will be appreciated that one potential situation with regard to a distributed network or system as defined in FIG. 1 is in respect of so called "islanding". FIG. 2 provides a schematic illustration of such islanding. Similar reference numbers have been utilised in FIG. 2 to those used in FIG. 1 for comparison. "Islanding" occurs when a distributed generator becomes disconnected from the rest of the electrical power distribution system or network to which it is normally connected. An example of "islanding" is if the high voltage circuit-breaker 16, of an electrical transformer 15 connecting a lower voltage electrical power system 14 to a higher voltage electrical power system 13, opens either in response to a fault 21 or otherwise. The distributed generator 18 in such circumstances may still continue to operate stably and simply supply a local demand referred to as "trapped load". The isolated area created by the opening of the circuit breaker 16 is a so called "power island" which as indicated may be self-sustained in terms of approximate balance between power demand and electrical generation provided by the generator 18.

Figure 1:
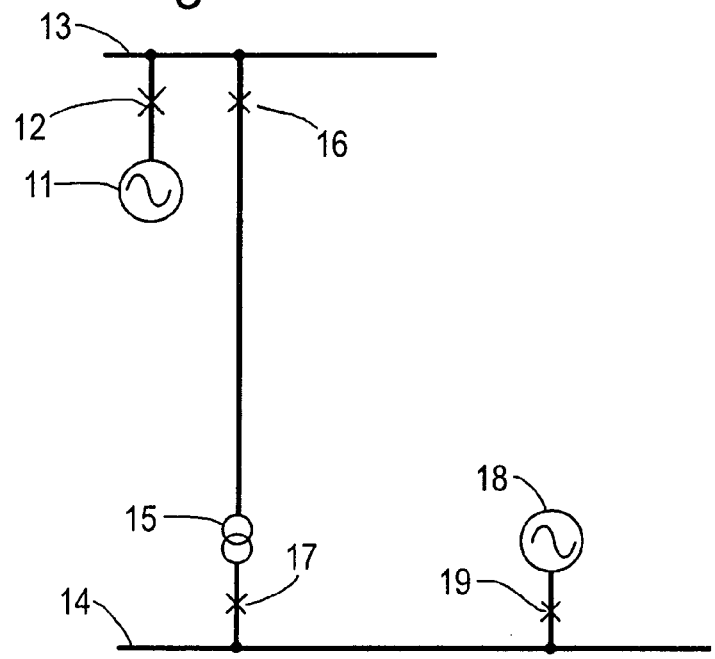
FIG. 1 illustrates a typical prior art distributed electrical generator arrangement.

Power islands or islanding can present a number of risks and problems with regard to operating a distributed system or network. For example there is a danger of electric shock in that maintenance personnel may believe that parts of the distributed system are not energised when supplies continue from the still connected generator 18. It will also be understood that electrical energy may be provided at voltages or frequencies which are contrary to expected or statutory limits as defined for the whole distribution network. It will also be understood that an unearthed distribution will continue to energise parts of the electrical distribution network which may constitute a public danger and may be illegal under certain regimes. Of particular interest with regard to ongoing distribution network maintenance is that the distributed generator 18 continues to energise parts of the electrical power network such that there is a significant risk "out-of-phase" re-closure of the respective electrical power generator 18 once the circuit breaker is closed and the power island returns to the whole distribution network. For example with regard to FIG. 2 as indicated a fault 21 may occur on a high voltage circuit between the high voltage electrical power system 13 and the electrical transformer 15. Protection equipment controlling the circuit breakers 16 will detect the fault current and open circuit breaker 16 to interrupt the fault current. Possibly, the circuit breaker 16 is fitted with an auto re-close mechanism (not shown) which detects the interruption of fault current and waits for a pre-determined time period to allow fault current de-ionization. After the time period has elapsed the auto re-close mechanism will re-close the circuit breaker 16 in an attempt to restore electrical supplies to the electrical transformer 15. However, there is a risk during the period when the circuit breaker 16 is open that the voltage, frequency and phase of the distributed generator 18 has drifted apart from the voltage frequency and phase of the high voltage electrical power system 13. The re-closure will therefore occur at an out-of-phase state with differences in voltages between the high voltage electrical system 13 and the distributed generator 18 causing large current flows. The consequences of such large electrical current flows can be catastrophic with resultant wrecked switchgear and damage to the generators 18 itself.

With high voltage electrical power systems it is known to provide "check-synchronising" protection monitors or otherwise with the respective circuit breakers. Such protection measures the voltage on each side of an open switch, that is to say the circuit breaker and only allows the switch to close either if the voltage on each side are of similar magnitude and are synchronised or if one or both sides of the switch are dead. However, check-synchronising protection is rarely used on low voltage electrical power systems as it is typically uneconomic and often impractical to provide such synchronising protection with every item of switchgear.

Figure 3:
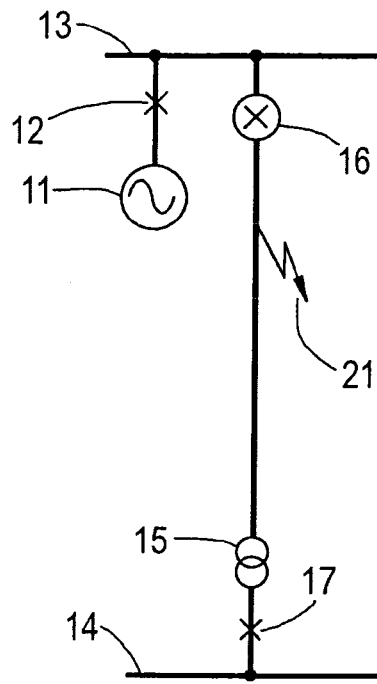
FIG. 3 illustrates an alternative approach to providing islanding protection through a loss-of-mains monitoring technique.
Figure 3:
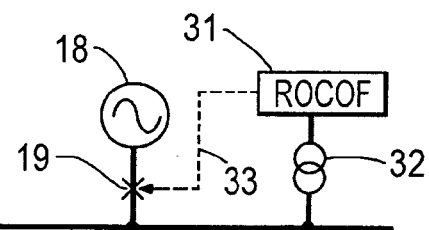

FIG. 3 shows an alternative approach to providing islanding protection through a so called "loss-of-mains" monitoring technique. In the example depicted in FIG. 3 islanding protection 31 measures the generator terminal voltage possibly using a voltage transformer 32 and possibly the current output of the generator via current transformers (not shown). If the islanding protection 31 detects islanding it takes mitigating action which possibly could include opening the generator circuit breaker 19 for the generator 18 through a tripping mechanism 33. The arrangement shown in FIG. 3 is a popular form of island protection and is known as "rate of change of frequency" (ROCOF) protection. The principle of operation assumes that immediately following the formation of a power island there will be mismatch of generation and demand until the generator governors match generation to demand. This mismatch causes a sudden change of frequency which the protection 31 detects.

Figure 2:
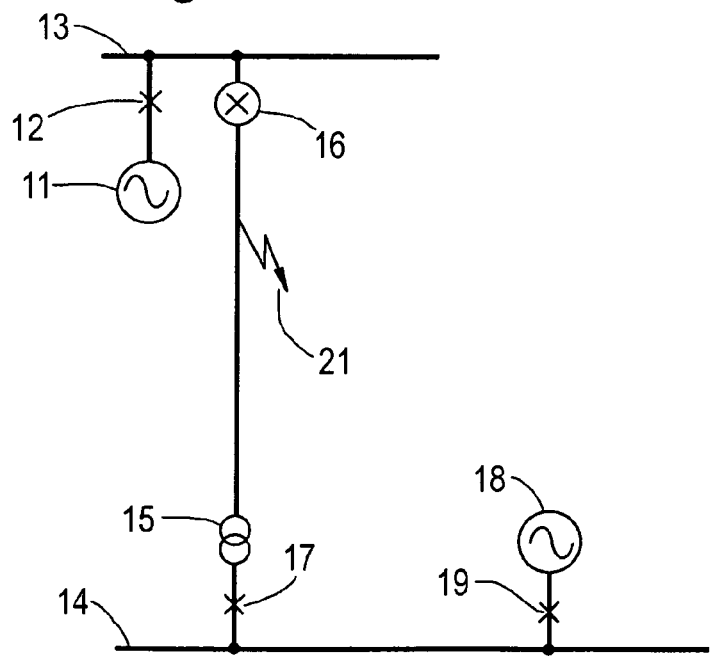
FIG. 2 schematically illustrates islanding with regard to a distributed network or system as illustrated in FIG. 1.
Figure 4:
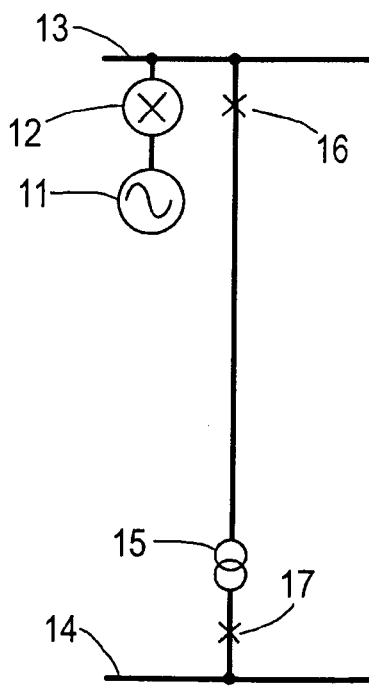
FIG. 4 illustrates the possible consequences of the loss of a major generator.
Figure 4:
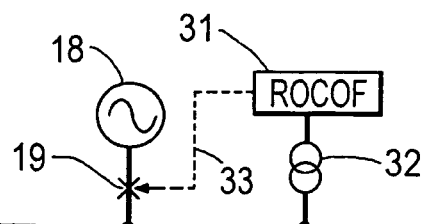

Unfortunately rate of change of frequency protection can not discriminate between local changes in frequency due to power islanding and system-wide frequency disturbances. It will be understood that there may be a sudden fall in frequency following the loss of a major power generator 11 or switch of high loads or other assets as depicted in FIGS. 1, 2 and 3. FIG. 4 provides an illustration of the possible consequences of the loss of a major generator 11. In such circumstances the high voltage electrical power system 13 will lose output from the generator 11. This loss may be as a result of the circuit breaker 12 opening due to a fault or otherwise. The loss will deny the output of the generator 11 to the high voltage electrical power system 13. The power system will suddenly change and an electrical system frequency transient will result. This frequency transient will be transmitted through the electrical transformer 15 into the lower voltage electrical power system 14. This frequency transient may be sufficiently severe such that the protection 31 for the distributed generator 18 will open the circuit breaker 19 to isolate the distributed generator 18. By such isolation of the distributed generator 18 it will be appreciated that the electrical output from this generator 18 is also lost aggravating overall system disturbance and threatening system security. Even if the electrical power system recovers from the disturbance the nuisance tripping of the distributed generator 18 will be unwelcome since this may cause financial losses. For example if the distributed generator 18 is part of a combined heat and power generation system it will be appreciated that this combined heat and power generation system may be supplying heat to processes which are intolerant of even brief interruptions in supply resulting in financial losses by disturbed processing regimes.

Figure 5:
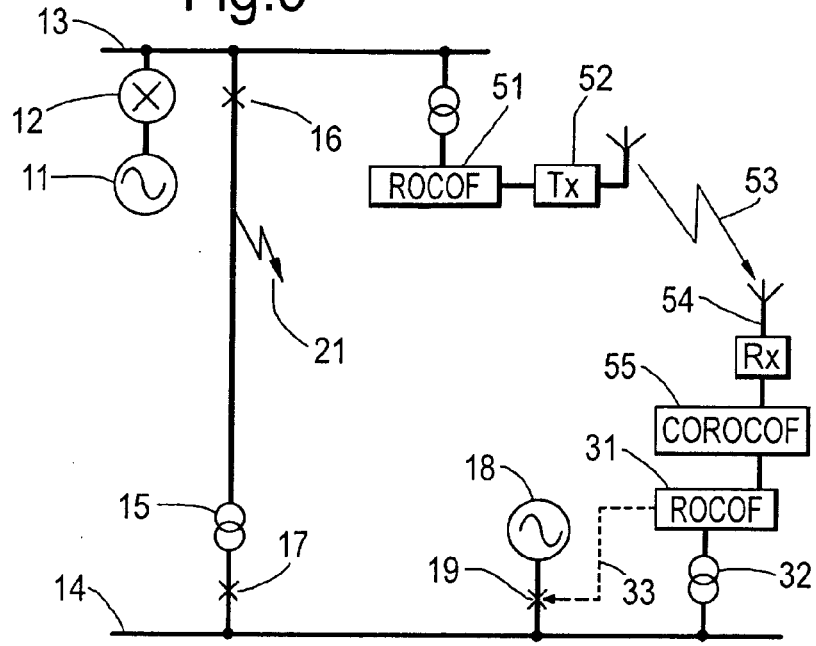
FIG. 5 illustrates the process of comparison of rate of change of frequency (COROCOF)

One way of improving the overall performance of rate of change frequency protection 31 is to arrange for comparison of the local change of frequency of the output of a distributed generator 18 with a similar measurement at one or more locations on the high voltage electrical power system. Thus, tripping and isolation of the distributed generator 18 will only occur if the comparison between the local change of frequency and the change of frequency upon the high voltage electrical power system indicates power islanding. This process is referred to as "comparison of rate of change of frequency" (COROCOF) and is illustrated in FIG. 5. As previously the rate of change of frequency is measured by a monitor relay 51 at a location on the high voltage system 13. If the monitor 51 measures a system disturbance that is likely to trip the local generator monitor 31 then the monitor 51 will operate a transmitter 52. This transmitter 52 will transmit a blocking signal 53 to a radio receiver 54 associated with a change of rate of change of frequency system 55 which in turn is connected to the monitor 31 associated with the distributed generator 18. The system 55 will block operation of the monitor 31 and so prevent opening of the circuit breaker 19 through a trip 33. Thus, if the system 55 blocks operation it will be understood that the circuit breaker 19 will not be opened due to a whole system frequency disturbance determination such as that as a result of switching of a major generator 11.

Comparison of rate of change of frequency protection is generally effective. However, it will be understood that there will be a need for several relay monitors 31 for associated distributed generators 18 in a practical distribution network along with transmitter sources and associated means from measuring the electrical system frequency at various places on the electrical distribution system. Each of the transmitter sources will be capable of transmitting a blocking signal to a radio receiver 54 and associated comparator 55 in order to block operation of the monitor 31 ensuring a trip signal 33 to open circuit breaker 19 is not sent and therefore isolation of the generator 18. In such circumstances the discrimination system or comparator 55 must be equipped to receive several blocking signals 53 from respective transmitter sources 51 all at once or separately.

Figure 6:
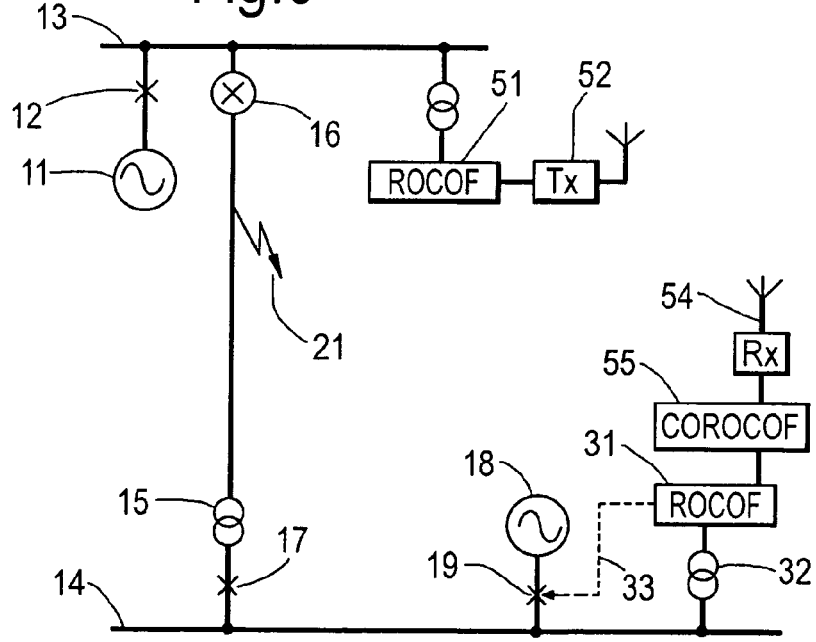
FIG. 6 illustrates the state of an electrical power distribution system following islanding of a distributed generator.

FIG. 6 shows the state of an electrical power distribution system following islanding of a distributed generator 18. This islanding may be as a result of opening of the high voltage circuit breaker 16 of the electrical transformer 15, connecting a lower voltage system 14 to a higher voltage system 13, in a response to a fault 21 or otherwise. The lower voltage electrical system 14 suffers a frequency transient. However, the higher voltage electrical system 13 does not suffer a frequency transient and therefore no blocking signal is sent. In such circumstances the rate of change of frequency monitor 31 which controls the circuit breaker 19 for the generator 18 does not receive a blocking signal. The monitor 31 will then open the circuit breaker 19 to isolate generator 18 or provide a more sophisticated response through some other controlling or mitigating action. A particular advantage of providing the comparison of rate of change of frequency system is that should this system fail, and therefore no blocking signal is detected, the arrangement will default to effectively an ordinary rate of change of frequency protection system. Overall protection is still maintained although as indicated with some spurious and erroneous tripping and isolation of the distributed generator 18. Nevertheless in order to confirm operation typically a transmitter 52 is designed to periodically issue test blocking signals. In such circumstances the protection system provides two additional functions. Firstly, the protection system will raise an alarm if it fails to receive an expected periodic test blocking signal. Furthermore, if periodic test blocking signals are not received then the protection system 55 will typically be arranged to default to a predetermined setting or characteristics which provide an acceptable compromise between fast action response to power islanding and providing some immunity to system wide frequency transients.

During undisturbed system conditions it will be understood that the protection system would ignore the periodic test blocking signals. However, there is a risk of a periodic test blocking signal will coincide with a distributed generator operating in a power island state. In such circumstances the monitor 31 would be prevented from operating. The possibility of such false operation can be reduced by encoding blocking signals 53 to ensure that the monitor 51 is operating dependant upon a particular characteristic of the electrical power distribution system 13. In such circumstances a protection system 55 would block the monitor relay 31 only if the modulation of the blocking signal 53 corresponds with the waveform of the output from the distributed generator 18 and therefore indicates that electric generator 18 remains connected to the high voltage electrical system 13.

Although comparative rate of change of frequency comparators utilised for protection systems are effective it will be understood that there will be a requirement for blocking transmitters 51 to be established to transmit blocking systems. Such transmitters 51 will require specific licensing and in any event will add to the expense of providing protection. As indicated previously provision of check synchronising protection systems for low voltage electrical power systems is considered uneconomic and therefore the necessity of providing specific blocking transmitters may also be considered too expensive. Alternative blocking signals could be shared with transmitters for other communications traffic which although cheaper requires the operators of such further communication systems to accept a provision of a blocking system but not causing undue interference with other traffic for those particular transmission systems. A further alternative would be to provide blocking signals which can be sent by land communications circuits but generally such approaches will be more expensive than radio frequency transmission systems. It is desirable to find a more practical way of implementing comparison of rate of change of frequency protection systems with regard to electrical generator arrangements comprising distributed generator networks.

Aspects of the present invention provide an electrical generator arrangement comprising a distribution network having a first generator and a second generator, the first generator arranged to provide electrical power to a transmitter source, the second generator coupled to the distribution network by a switch to enable isolation of the second generator, the switch associated with an electrical characteristic comparator to compare the phase and/or frequency of the voltage provided by the second generator with the incidental modulation of a transmitter signal from the transmitter due to variations in the phase and/or frequency of the voltage provided by the first generator to the transmitter, the comparator arranged to operate the switch to isolate or connect the second generator to the distribution network dependent upon a variation in the phase and/or frequency of the voltage provided by the second generator and the incidental modulation of the transmitted signal.

Alternatively in accordance with aspects of the present invention there is provided a method of controlling an electrical generator distribution network comprising a first generator and a second generator, the first generator providing electrical power to a transmitter source, the second generator coupled to the network by a switch associated with an electrical characteristic comparator, the method using the comparator to compare the phase and/or frequency of the voltage provided by the second generator and incidental modulation of a transmitted signal from the transmitter due to variations in the phase and/or frequency of the voltage provided by the first generator to the transmitter, the method using similarity and/or disparity between the respective phase and/or frequency of the voltage of the second generator and the incidental modulation of the transmitted signal to control the switch.

Typically, the first generator is a high voltage generator compared to the second generator.

Typically, the switch is a circuit breaker to a low voltage system of the distribution network relative to a high voltage system associated with the first generator, the low voltage system and the high voltage system coupled through a transformer. Generally, the transformer has a circuit breaker to the high voltage system and a circuit breaker to the low voltage system.

Typically, the transmitter is associated with the first generator through a transformer.

Typically, the comparator is a rate of change of frequency comparator. Alternatively, the comparator is a voltage vector shift comparator for voltage.

Generally, there is a plurality of first generators. Typically, there is a plurality of second generators. Typically, the distribution network comprises a high voltage power system and a low voltage power system.

Typically there is a plurality of transmitters. Generally, the comparator includes means for discriminating between transmitters. Possibly, the comparator includes means for identifying forbidden transmitters which may be associated with the second generator.

Typically, the second generator may provide electrical power to a power island defined by part of the distribution network and the switch is arranged to isolate the second generator from the power island when the phase and/or frequency of the voltage of the second generator differs from that of the first generator as determined by the comparator.

Aspects to the present invention will now be described by way of example and with reference to the accompanying drawings in which:—

Figure 7:
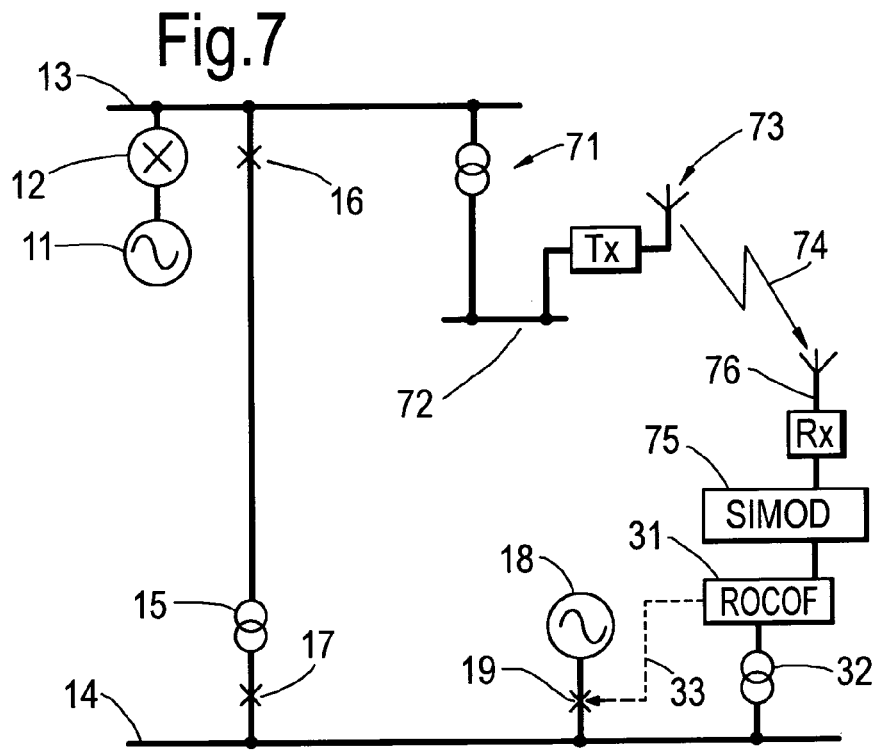
FIG. 7 schematically illustrates an electrical generator arrangement in accordance with aspects of the present invention during normal operation.
Figure 8:
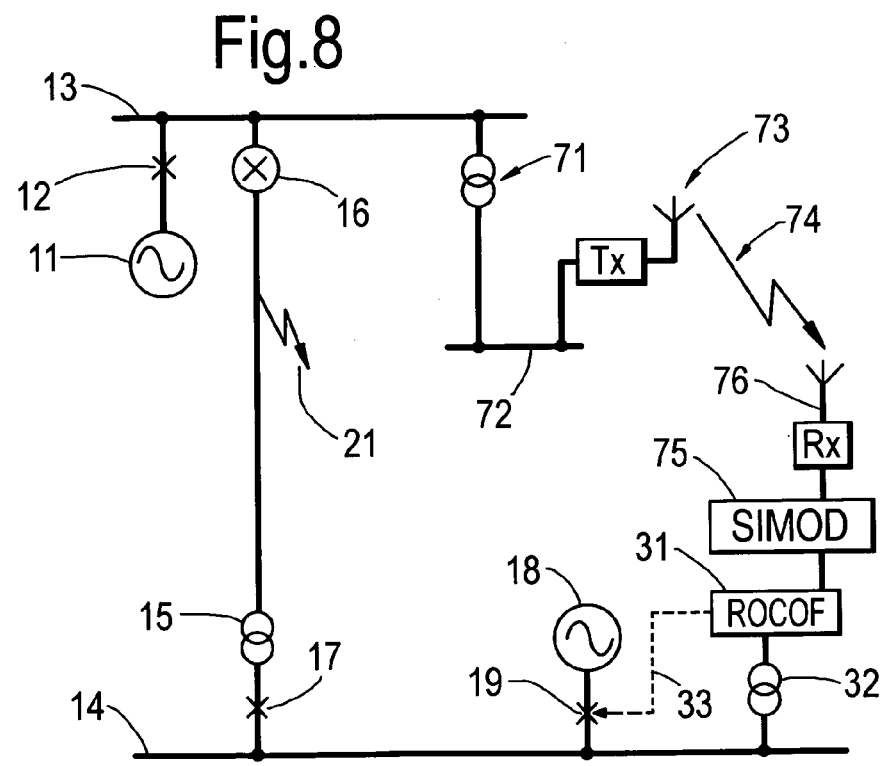
FIG. 8 schematically illustrates the arrangement of FIG. 7 during a power islanding episode.
Figure 9:
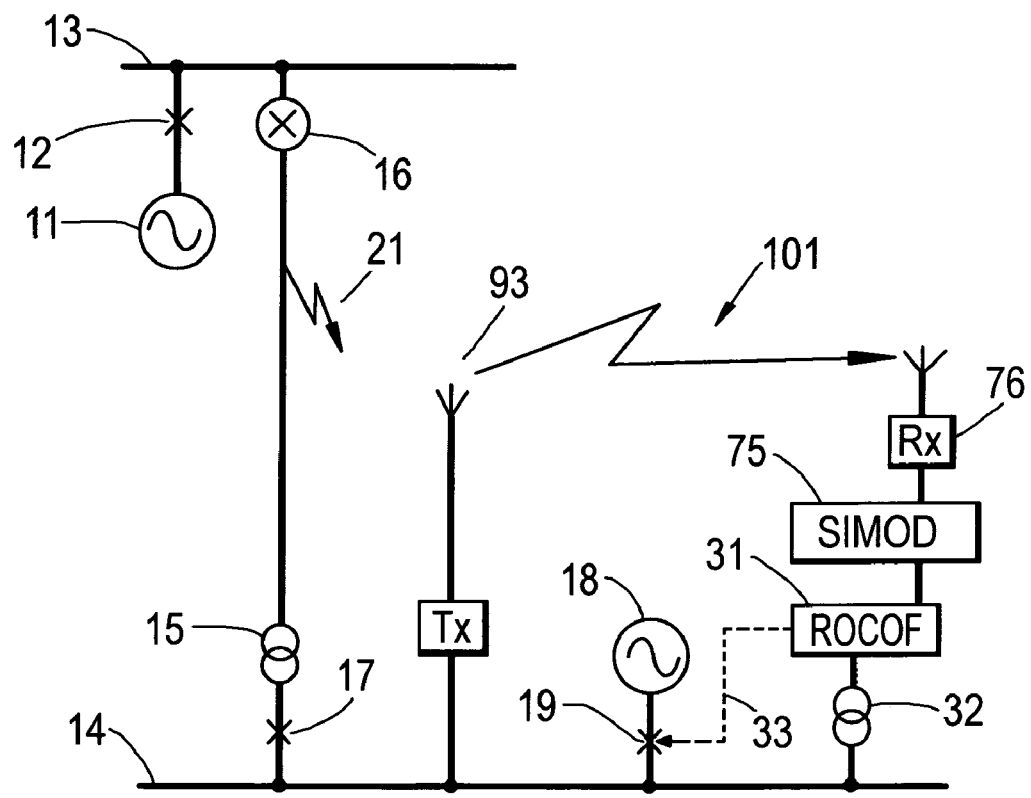
FIG. 9 illustrates an electrical arrangement in which the comparator discriminates between transmitters.

FIG. 7 provides a schematic illustration of an electrical generator arrangement in accordance to aspects of the present invention during normal operation;

FIG. 8 provides a schematic illustration of the arrangement depicted in FIG. 7 during a power islanding episode; and, FIG. 9 illustrates an electrical power generator arrangement in which the comparator is arranged to discriminate between transmitters.

It will be understood that a comparative rate of change of frequency (COROCOF) approach to operational control of electrical generator arrangements depends upon measurements of voltage wave forms at the output of a distributed generator 18 in comparison with measurement and voltage wave forms at one or more distributed locations on a distribution network. These distributed locations will typically be in the high voltage electrical power system associated with that network. The COROCOF approach allows determination of whether a generator has lost synchronism with the rest of the distribution network and therefore has become a power island. In such circumstances comparison is achieved through measurement of the wave forms at the one or more locations and the measurements must be transmitted as signals to the distributed generator fitted with protection to compare the transmitter signals with the voltage wave form of the output of the associated distributed generator. A problem arises with regard to transmitting the signals from the distributed locations for comparison. In accordance with aspects of the present invention problems with regard to provision of dedicated transmitters are avoided.

Aspects to the present invention use "transmitters of opportunity" to provide the comparative signals for use with respect to determining power islanding by a distributed generator. These transmitters of opportunity are existing broadcast radio transmitters which may be used to provide a phase and frequency reference signal in order to determine power islanding. The existing radio transmitters are utilised by virtue of incidental modulation of those transmitters by associated electrical power generators. For the purposes of this description these power generators for the transmitters will be considered first generators.

It will be appreciated that radio transmitters transmit information by modulation of a radio frequency carrier by a lower frequency signal containing information to be transmitted. Common forms of modulation are amplitude modulation (AM) where a lower frequency signal changes the amplitude of the radio frequency carrier wave and frequency modulation (FM) where a lower frequency changes the frequency of the radio frequency carrier wave. A perfect radio transmitter would produce only one type of modulation. However, in practice transmitters are not ideal and perfect and so produce other forms of modulation. These other forms of modulation are termed "incidental modulation". Incidental modulation is generally detrimental and unwanted as such incidental moderation can cause interference with communications. In such circumstances most transmitters are designed to seek to minimise incidental modulation although it can not be completely eliminated.

Aspects to the present invention utilise the existing incidental modulation to transmitted signals as indicated caused by the first generators. Some incidental modulation will be modulation of the radio frequency carrier by variations in the electrical supply to the transmitter from the first generator. This component can be termed "supply incidental modulation" utilised in accordance with aspects of the present invention. If the transmitter has an alternating electrical supply the supply incidental modulation will contain harmonics of the alternating current frequency. It will be understood that the supply incidental modulation will either be single phase supply incidental modulation or three-phase supply incidental modulation dependant upon whether the transmitter has a single phase or a three-phase supply from the first generator. Single phase supply incidental modulation would be twice the alternating current supply frequency (ignoring high order harmonics) but three-phase supply incidental modulation will be at six times the alternating current supply frequency (ignoring higher order harmonics).

By utilising the frequency of the supply incidental modulation a fixed multiple of the frequency of the alternating current supply to the transmitter in question, it will be understood that a measurable frequency of the associated first generator is obtainable. In such circumstances, supply incidental modulation can be used as a comparison signal for protection discrimination and control according to aspects to the present invention.

It is known to provide rate of change of frequency monitors (FIGS. 3-6) which measure the frequency of the output voltage of the distributed generator 18. For the purposes of this description the distributed generator 18 will be considered a second generator. When a rate of change of frequency monitor fitted to a second generator measures a rate of change of frequency that exceeds a protection level then the monitor will compare the frequency and the rate of change of frequency of the output voltage from the second generator with similar characteristics of the supply incidental modulation. The comparison will allow for the supply incidental modulation being a fixed multiple of the frequency of the alternating electrical power from the first generator to the transmitter in question and therefore also normally a fixed multiple frequency of the output of the second generator. The comparison will generally be in terms of "per-unit" which is a method widely used in electrical engineering. In per-unit terms, a quantity or change in a quantity is expressed as a fraction of a base quantity. For example, a change in frequency of 1 Hz on a 50 Hz system is a change of 1/50=0.02 pu.

Aspects to the present invention can be considered as a system for supply incidental modulation discrimination protection. FIG. 7 illustrates an electrical generator arrangement during a system wide frequency disturbance. Similar reference numerals have been utilised with regard elements of the electrical generator arrangement consistent with prior arrangements depicted in FIGS. 1-6. In FIG. 7, a transformer 71 connects a low voltage electrical supply system 72 to the high voltage electrical power system 13 of the distribution network described previously. Possibly, the transformer 71 is fitted with electrical circuit breakers but these are not relevant to the protection system in accordance with aspects of the present invention and therefore are not shown or described. The high voltage system 72 supplies a broadcast transmitter 73 which not only broadcasts the wanted signal but also broadcasts supply incident modulation 74. The electrical power provided to the transmitter 73 is from the first generator 11 coupled to the high voltage system 13 by the transformer 71.

The second distributed generator 18 has a rate of change of frequency relay monitor 31 to provide island protection as described previously. The protection system provided to the second distributed generator 18 also incorporates a supply incidental modulation discrimination protection (SIMOD) module in accordance to aspects of the present invention. This module 75 measures the voltage waveform of the output of the second generator 18 and compares this with the supply incidental modulation 74 received from the transmitter 73 through a receiver 76.

If a system wide frequency disturbance occurs, for example due to the loss of a first high voltage power generator 11, the following factors would apply:

a) The per-unit frequency of both the frequency of the second generator 18 and the supply incidental modulation as determined by the module 75 would be the same.

b) The per-unit rate of change of frequency of the second generator 18 voltage and the supply incidental modulation as determined by the module 75 would be the same.

c) The phase angle between the second generator output voltage and the supply incidental modulation as determined by the module 25 would not change.

As indicated the module 75 would act as a discriminator in order to make the above comparisons and would deduce that despite the frequency transient measured in terms of the voltage waveform of the output of the second generator 18, the second generator remains connected to the rest of the system. In such circumstances the module 75 in terms of discrimination would block the operation of the monitor 31 in terms of providing the trip 33 to open the circuit breaker switch 19 to isolate the second generator 18. The second generator 18 would continue to be connected to the distribution network and provide electrical power to the low voltage power system 14 as well as the high voltage power system 13 through the transformer 15.

FIG. 8 illustrates an electrical generator arrangement in accordance with aspects of the present invention during a power island incident. As previously for consistency similar reference numerals have been used with regard to functional elements as those utilised with respective FIGS. 1-7. In FIG. 8 a power island is determined by the electrical generator arrangement and method in accordance to aspects of the present invention. When the high voltage circuit breakers 16 of the electrical transformer 15 connecting a low voltage system 14 to a high voltage system 13 opens either in response to a fault or otherwise a power island as described above is created. In accordance with aspects of the present invention the second distributed generator 18 may continue to operate stably. The generator 18 as described will typically supply local demand (trapped load) in order to maintain the so-called power island. During a power island incident the second distributed generator 18 will provide the following characteristics:

a) The per-unit frequency of the output voltage of the second generator 18 will be different to the supply incidental modulation 74 as determined by the module 75.

b) The per-unit rate of change of frequency of the output voltage of the second generator 18 will be different to that of the supply incidental modulation 74 as determined by the module 75.

c) The phase angle between the output voltage of the second generator 18 and the power incidental modulation 74 would change suddenly and thereafter vary with time.

In the above circumstances the SIMOD discrimination module 75 would make the above comparison and deduce that the transient measured in the voltage waveform of the output of the second or distributed generator 18 was due to the second generator being part of a power island. In such circumstances the module 75 would unblock operation of the rate of change of frequency relay monitor 31 associated with the second or distributed generator 18. In such circumstances the relay monitor would provide a trip signal 33 to the circuit breaker switch 19 of the second or distributed generator 18 to open the switch 19. In such circumstances the second generator 18 would be isolated from the low voltage system 14.

As with all communication systems there is the potential for failure to receive a satisfactory supply incidental modulation signal from the transmitter 73 to the receiver 76. Such failure could be due to a failure of one or more of the transmitters of opportunity due to a fault, maintenance or otherwise or electrical interference. In such cases electrical generator arrangements and methods according to aspects of the present invention will be designed to mitigate the consequences of such failure to receive sufficient satisfactory supply incidental modulation signals 74 from one or more locations in the distribution network as references for the voltage output from the second generator. Such mitigation would result in a protection system comparable with prior art change of frequency protection systems. In prior art systems it will be understood that if the comparison system failed then the protection system would be designed to default to an ordinary rate of change of frequency protection regime so the overall protection would be no worse. However, the protection system in such circumstances would raise an alarm if it failed to receive satisfactory supply incidental modulation signals 74 for a long or protracted period of time. It will be appreciated that the electrical generator arrangement and method in accordance with aspects of the present invention could be configured to take further mitigating action such as, for example, defaulting to different protection settings or characteristics chosen to be an acceptable compromise between fast action in response to power islanding and reasonable immunity to system wide frequency transients.

As indicated above a particular advantage with regard to aspects of the present invention is the utilisation of existing transmitters about a distribution network. With regard to frequency modulated transmitters it will be appreciated that transmitters are likely to produce supply incidental modulation 74 that is amplitude modulated. However, it is also understood that different embodiments may use different forms of modulation thus, for example one embodiment could use amplitude modulation transmitters which produce supply incidental modulation which is frequency modulated. Furthermore, a variety of transmitters using different forms of modulation could be used such that flexibility with respect to use of transmitters of opportunity can be inbuilt into electrical generator arrangements and the method to ensure an appropriate robustness in operation.

It should be appreciated that clear distinctions should be made between individual transmitters and transmitter sites. A transmitter is an electronic device that generates radio frequency energy for transmission by an aerial possibly on a transmitter mast or tower. To save costs, several transmitters will normally be associated with the same transmitter mast or tower and several masts or towers may occupy the same transmitter site. In such circumstances aspects of the present invention utilise a transmitter source or site which will usually have the same electrical power supply from a first generator serving several transmitters and therefore these several transmitters will operate from the same common electrical power supply from that first generator. In terms of aspects of the present invention this transmitter site as indicated will be considered a transmitter source where the supply incidental modulation will be consistent for each of the transmitted signals from that transmitter source even though there may be several separate and distinct transmitter signals emitted from the same transmitter source. For example, there may be six transmitter sites 91 to 96 each providing respective frequency and modulated transmitted signals which can provide a source of supply incidental modulation in accordance to aspects of the present invention. It will be understood that each transmitter on the same site or transmitter source 91-96 will usually operate from the same mains electrical supply which for the purposes of description is provided by the first generator. In such circumstances each transmitter of a transmitter source will not provide multiple independent sources of supply incidental modulation for comparison by the SIMOD module 75 in accordance to aspects of the present invention. Should there be a loss of mains electrical power to one of the transmitter sites 91-96 the supply incidental modulation from all transmitters on that site will be lost, but other transmitters at other sites 91-96 may continue to operate. In such circumstances in accordance with aspects of the present invention a SIMOD module will be configured such that it can receive signals from as many transmitter sources or sites as well individual transmitters as practical in order that if a transmitter at one transmitter source or site fails then other transmitters at that source or site will continue to provide supply incidental modulation for use by the module 75 or if the whole transmitter source or site should fail other transmitter sources or sites are available. In such circumstances the electrical generator arrangement and method will not be vulnerable to failure of individual transmitters or all transmitters at a particular transmitter site or source.

Receiving transmissions from all transmitters at the same transmission source or site would be generally helpful in terms of measuring the supply incidental modulation due to electrical power supply at that transmitter source. The supply incidental modulation due to alternating current electrical supply would normally be common to all the transmitters and signals at that transmitter source. Furthermore, as indicated the transmitted signal will generally be of a carrier wave and particular carrier waves may be more useful with regard to determining the supply incidental modulation than others. In such circumstances as indicated all those transmitted signals which are most effective may be utilised by the SIMOD module 75 in accordance with aspects of the present invention. In such circumstances the receiver 76 in accordance with aspects to the present invention utilised with regard to the SIMOD module 75 could have an auto-tuning feature that selects the stronger transmitted signals, especially those having the supply incidental modulation that most closely corresponds to the voltage waveform of the output of the second or distributed generator 18 for comparison.

Although utilisation of supply incidental modulation discrimination provides in accordance to aspects of the present invention improved performance it will be appreciated that care must be taken with regard to situations which may distort or corrupt electrical generator arrangement operation and the method in accordance with aspects of the present invention.

Such situations include where a transmitter source is supplied by a standby electrical power generation system rather than the first generator in accordance to aspects of the present invention and situations where a power island itself incorporates a transmitter or transmitter source.

With regard to a transmitter source supplied by a standby generation source it will be appreciated that the transmitters in such circumstances will still provide generation of radio transmitted signals despite the failure of the electrical supply from the first generator. The phase and frequency of the standby generation system will differ from that of the first generator and the second generator in respective electrical systems 13, 14 of the distribution network. In such circumstances the consequence of such differences means that the supply incidental modulation discrimination provided by the transmitter signals will drift with respect to the high and low voltage electrical systems 13, 14. In such circumstances the supply incidental modulation derived from the standby generation system will be useless for discrimination purposes in accordance with aspects of the present invention. In such circumstances aspects to the present invention avoids such risks with regard to discrimination through the following:

a) The SIMOD module 75 will only make a phase, frequency and rate of change of frequency comparison when the monitor 31 detects a frequency transient in the voltage of the output of the second or distributed generator 18. Such an approach will avoid the module 75 operating in error in response to transients in one or more supply incidental modulation signals due to failures in the mains alternating electrical supply provided by the first generator to one or more transmitter sources.

b) If the SIMOD module 75 detects the supply incidental modulation from one or more transmitter sources changes and loses synchronism with the voltage waveform of the output from the second generator 18, then the module 75 will disregard the supply incidental modulation in question from that transmitter signal and tune to other transmitter sources instead. The SIMOD module in such circumstances will also advantageously raise an alarm which advises that a particular transmitter or transmitter sources is producing supply incidental modulation that is no longer in synchronism with the waveform of the output of the second generator 18.

c) The SIMOD module may tune back to the supply incidental modulation that has lost synchronisation if the supply incidental modulation returns to synchronism with the voltage of the second generator 18. However, the SIMOD module should wait until the supply incidental modulation is reasonably stable before relying upon it for protection discrimination. In such circumstances the re-established new supply incidental modulation from each transmitter source may be effectively placed into "quarantine" until confidence is established with regard that transmitted signal from the transmitter source. In such circumstances the SIMOD module will produce a signal that advises which transmitter or transmitter sources are producing supply incidental modulation that is stable and has returned to synchronism with the voltage waveform of the output of the second or distributed generator 18.

A further potential risk with regard to utilisation of incidental modulation discrimination is that as the electrical generator arrangement and method is dependent up on a transmitted signal. This transmitted signal may originate from a transmitter source which is part of a potential power island. It will be understood that within any distribution network power islands can be created through appropriate opening of switches or circuit breakers in a number of configurations and therefore it is possible that a transmitter source could be incorporated within a power island. Clearly, if a transmitter source is within a power island then its supply incidental modulation would provide a spurious result indicating that the second generator was still connected to the broader distribution network when this was not the case.

FIG. 9 illustrates a situation where a transmitter source may be incorporated within a power island and an approach with regard to the electrical generator arrangement and method to avoid such situations producing spurious results in accordance with aspects to the present invention. As with regard to previous FIGS. 1 to 8 similar reference numbers have been utilised for comparison and consistency. In the arrangement depicted in FIG. 9 the second generator 18 is associated closely with a transmitter 93. The transmitter source 93 receives electrical power from the second generator 18 and also potentially from the first generator 11 through the link provided by the circuit breaker switches 16, 17 and the transformer 15. In such circumstances should the high voltage circuit breaker 16 open a power island would be created comprising a second generator 18 and including the transmitter source 93. The rate of change of frequency monitor 31 associated with the generator 18 would measure transients in the output voltage of the distributed or second generator 18. However, the SIMOD module 75 would observe that the transients in the output voltage of the second generator 18 match similar transients in the supply incidental modulation 101 transmitted from the transmitter source 93. The power source for the transmitter source 93 is not a first generator but a second generator 18. Clearly, this will be incorrect with regard to the determination of power islands in accordance with aspects to the present invention. In effect due to the supply incidental modulation 101 from the transmitter source 93 being as a result of as now electrical power supplied by the second generator solely it will be determined by the module 75 that the generator 18 is still part of the overall distribution network.

In order to avoid problems with regard to transmitter sources in accordance with aspects of the present invention being associated within a power island, the module 75 will operate in accordance with the following:

a) The supply incidental modulation provided by the SIMOD module 75 should always be based upon discrimination according to supply incidental modulation received from several different transmitter sources. In such circumstances although one or more of the transmitter sources may be included within the power island by appropriate choice and commission of several different transmitter sources the probability that all transmitter sources will be included within the power island is diminished.

b) Within electrical generator arrangements in accordance with aspects of the present invention certain transmitter sources will be defined as "forbidden transmitter" sources. Such "forbidden transmitter" sources will be those that might form part of a power island with a second generator such that the power island is unprotected against out-of-phase re-closure. Forbidden transmitters would be determined for each second generator 18 and would depend upon the potential configurations of the electrical power systems 13, 14 in terms of creating possible power islands within the overall distribution network. In such circumstances the list of forbidden transmitters or those transmitters to be fully or partially treated with caution would be stored in the SIMOD module 75. In such circumstances if the electrical generator arrangement or method was dependent solely on these forbidden transmitters then the arrangement would default to a base simple rate of change of frequency monitor protection system as described above with regard to monitor 31 or the module 75 would be programmed to auto-tune in order to provide confirmation from other transmitter sources as confirmation as to the veracity of the supply incidental frequency modulation provided by the forbidden transmitter. It will be appreciated that most transmitters and particularly those transmitters associated with frequency modulation may transmit a digital signal identification code and possibly a differential global positioning system correction code such that the module 75 would be able to identify and discriminate between forbidden transmitters in accordance with aspects of the present invention. It will also be appreciated that the list of forbidden transmitters may be updated manually or automatically according to changes in the electrical power systems 13, 14 within the distribution network. Such updating of forbidden transmitters may depend upon different alterations and configurations to the distribution network in terms of potential power islands as a result of upgrading or modification of the distribution network in terms of switches which could constitute power islands within the distribution network.

A particular advantage regarding aspects of the present invention as indicated above is that the electrical generator arrangement and method utilises existing transmitter sources rather than requiring dedicated communication systems. Such an approach will enhance operability and utilisation.

Although the above describes supply incidental modulation discrimination as particularly applicability with regard to rate of change of frequency monitors in accordance with aspects of the present invention it will be appreciated that other forms of monitors utilised to control switches for connecting or isolating second generators can be used. Such other monitors include voltage vector shift protection monitors which are also used with respect power island protection systems.

Aspects to the present invention can be utilised with regard to amplitude modulated supply incidental modulation from broadcast frequency modulated transmitters. However, any transmitter may be used provided the signal transmitted from the transmitter is modulated by the voltage waveform of the electrical supply to that transmitter. The modulation of electrical supply to the transmitter could be any form of modulation with the radio receiver of the supply incidental modulation module 75 designed accordingly. Examples of possible types of transmitters are mobile telephone base transmitter stations, radio navigation beacons, radar transmitters, radio time standards, broadcast AM stations, Digital Audio Broadcast (DAB) stations and base stations of private mobile radio systems. Some transmitters may not be suitable such as television transmitters. Television transmitters generally have field synchronisation pulses deliberately set to be equal to the declared mains frequency of the transmitter service area, though not locked to that frequency. In such circumstances attempts are made to suppress supply incidental modulation utilised in accordance with the present invention. These field synchronisation pulses may cause incidental modulation with a frequency close to a multiple of the output of the secondary generator 18 negating the effects of aspects of the present invention. Such incidental modulation could be mistaken for supply incidental modulation by the SIMOD modules 75 in accordance with aspects of the present invention.

Aspects of the present invention could be utilised for so-called radio-phasing. Radio phasing is a technique whereby a particular phase of a three-phase supply can be identified. Existing methods of radio-phasing modulate a radio signal from the alternating current waveform of one of the phases of the three-phase supply. This radio signal is compared with the voltage waveform of the phase to be determined and the phase angle between the two is measured. Normally, radio phasing uses a private mobile radio system but such an approach blocks a radio channel during the radio phase tests and so can be considered disadvantageous and extravagant when there is limited communications capability.

Radio-phasing could use single-phase supply incidental modulation instead. The phase relationship of the single-phase supply incidental modulation emitted by a transmitter or transmitters could be compared to a live conductor of known phase before and after a radio-phase test. In such circumstances it will be understood that it will be possible to avoid the need to know which phase was supplying the transmitters emitting the single-phase supply incidental modulation. Such an approach would also guard against an operator transferring a supply to a transmitter from one phase to another and therefore effecting the radio-phasing measurements.

Three-phase incidental modulation would be unsuitable for radio-phasing since the frequencies would be six times that of the alternating current electrical supply. Since this is a multiple of three, this would lead to ambiguity in attempting to identify phase relationships in a three-phase system.

Aspects to the present invention could also be utilised with regard to obtain phase, frequency and rate of change of frequency and change in voltage of an electrical power system supplying a transmitter. Therefore, aspects to the present invention could be used to obtain information about the voltage of an electrical power system, whether that is alternating current or direct current supplying a transmitter. For example, measurements of incidental modulation emitted by a transmitter or transmitters on a vehicle could be used to monitor an electrical signal indicative of that vehicle from a fixed location or another vehicle. Such an approach may be useful with regard to tracking and surveillance.

Thus, as described in the specification the present invention compares waveforms of the voltage of the second generator and the incidental modulation of the transmitted signal and in particular compares the phase and/or frequency of the voltage provided by the second generator and the incidental modulation of the transmitter signal due to variations in the phase and/or frequency of the voltage provided by the first generator to the transmitter.

The distance between a transmitter and the protection system for the second generator introduces a phase delay according to the velocity of the electromagnetic radiation and the frequency of the electrical system to which the protection system for the second generator and the transmitter are usually connected. This phase delay, if significant, may be entered as a protection setting in the protection system for the second generator.

The invention claimed is:

1. An electrical generator arrangement comprising a distribution network having a first generator and a second generator, the first generator arranged to provide electrical power to a transmitter source, the second generator coupled to the distribution network by a switch to enable isolation of the second generator, the switch associated with an electrical characteristic comparator to compare the phase and/or frequency of the voltage provided by the second generator with an incidental modulation of a transmitter signal from the transmitter due to variations in the phase and/or frequency of the voltage provided by the first generator to the transmitter, the comparator arranged to operate the switch to isolate or connect the second generator to the distribution network dependent upon a variation in the change of the phase and/or frequency of the voltage provided by the second generator and the incidental modulation of the transmitted signal.

2. An arrangement as claimed in claim 1 wherein the comparator is a rate of change of frequency comparator or a voltage vector shift comparator.

3. An arrangement as claimed in claim 1 wherein the first generator is a high voltage generator compared to the second generator.

4. An arrangement as claimed in claim 1 wherein the switch is a circuit breaker to a low voltage system of the distribution network relative to a high voltage system associated with the first generator, the low voltage system and the high voltage system coupled through a transformer.

5. An arrangement as claimed in claim 4 wherein the transformer has a circuit breaker to the high voltage system and a circuit breaker to the low voltage system.

6. An arrangement as claimed in claim 1 wherein the transmitter is associated with the first generator through a transformer.

7. An arrangement as claimed in claim 1 wherein the transmitter incorporates a rate of change frequency monitor.

8. An arrangement as claimed in claim 1 wherein there is a plurality of first generators.

9. An arrangement as claimed in claim 1 wherein there is a plurality of second generators.

10. An arrangement as claimed in claim 1 wherein the distribution network comprises a high voltage power system and a low voltage power system.

11. An arrangement as claimed in claim 1 wherein there is a plurality of transmitters.

12. An arrangement as claimed in claim 1 wherein the comparator includes means for discriminating between transmitters.

13. An arrangement as claimed in claim 1 wherein the comparator includes means for identifying forbidden transmitters which may be associated with the second generator.

14. An arrangement as claimed in claim 1 wherein the second generator provides electrical power to a power island defined by part of the distribution network and the switch is arranged to isolate the second generator from the power island when the phase and/or frequency of the voltage of the second generator differs from that of the first generator as determined by the comparator.

15. A method of controlling an electrical generator distribution network comprising a first generator and a second generator, the first generator providing electrical power to a transmitter source, the second generator coupled to the network by a switch associated with an electrical characteristic comparator, the method using the comparator to compare the phase and/or frequency of the voltage provided by the second generator and incidental modulation of a transmitted signal from the transmitter due to variations in the phase and/or frequency of the voltage provided by the first generator to the transmitter, the method using similarity and/or disparity between the respective phase and/or frequency of the voltage of the second generator and the incidental modulation of the transmitted signal to control the switch.

16. A method as claimed in claim 15 wherein the comparator is a rate of change of frequency comparator or a voltage vector shift comparison.

17. A method as claimed in claim 15 wherein there is a plurality of first generators.

18. A method as claimed in claim 15 wherein there is a plurality of second generators.

19. A method as claimed in claim 15 wherein there is a plurality of transmitters.

20. A method as claimed in claim 15 wherein the comparator includes means for discriminating between transmitters.

21. A method as claimed in claim 15 wherein the comparator includes means for identifying forbidden transmitters which may be associated with the second generator.

22. A method as claimed in claim 15 wherein the second generator provides electrical power to a power island defined by part of the distribution network and the switch is arranged to isolate the second generator from the power island when the phase and/or frequency of the voltage of the second generator differs from that of the first generator as determined by the comparator.

* * * * *